C. LE G. FORTESCUE.
VACUUM TYPE CONVERTER SYSTEM.
APPLICATION FILED NOV. 3, 1916.

1,244,486.

Patented Oct. 30, 1917.

WITNESSES:

INVENTOR
Charles Le G. Fortescue.
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

VACUUM-TYPE CONVERTER SYSTEM.

1,244,486.  Specification of Letters Patent.  Patented Oct. 30, 1917.

Application filed November 3, 1916. Serial No. 129,278.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Vacuum-Type Converter Systems, of which the following is a specification.

My invention relates to systems of distribution embodying vacuum-type converters, and it has for its object to provide means whereby the rectified currents, in systems of the character designated, may be rendered substantially devoid of ripples and, therefore, well adapted for use as substitutes for ordinary direct currents.

Figure 1:
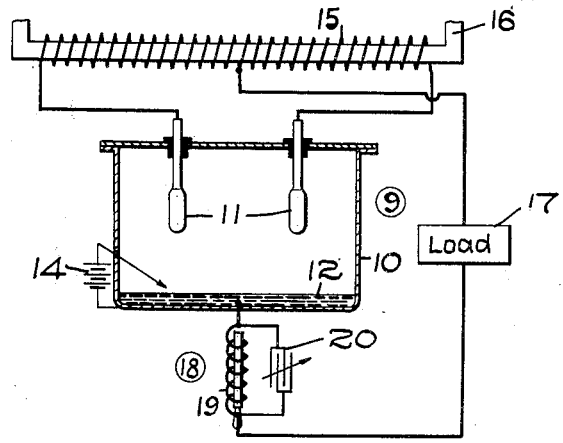
Figure 2:
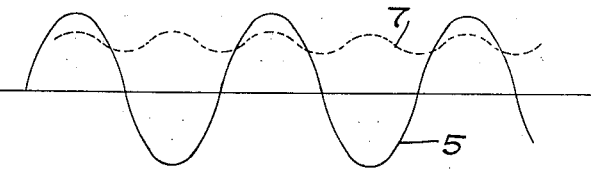
Figure 3:
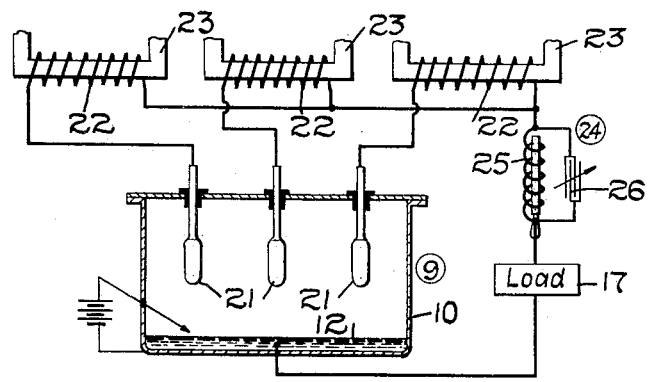
Figure 4:
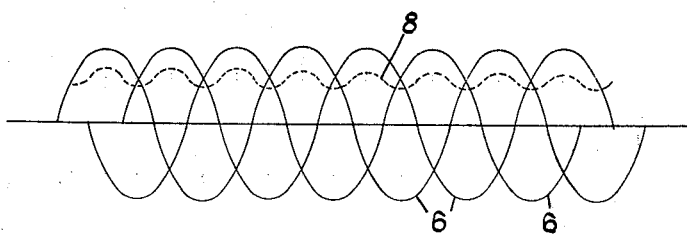

In the accompanying drawing, Figure 1 is a diagrammatic view, partially in section and partially in elevation, of a vacuum-type converter, together with its associated load and supply circuits and auxiliary apparatus embodying a preferred form of my invention; Fig. 3 is a diagrammatic view of a modification of the system shown in Fig. 1, relating particularly to polyphase operation; and Figs. 2 and 4 are diagrams illustrating the current conditions in the systems of Figs. 1 and 3, respectively.

It is well known that rectified currents obtained from a vacuum-type converter are not strictly uniform in value but embody ripples the frequency of which is equal to the supply frequency multiplied by the number of active de-phased anodes or of active de-phased arcs. In other words, the rectified current from a singlephase, two-anode-type converter contains double-frequency ripples while that obtained from a three-phase, three-anode converter contains triple-frequency ripples, etc. The reason for this phenomenon is obvious from an inspection of Figs. 2 and 4 which show, respectively, single-phase and three-phase supply currents at 5 and 6, respectively and the rectified current at 7 and 8, respectively.

For many types of load, such, for example, as series-connected street lights, said ripples are harmless, but when it is desired to utilize the rectified current for operating translating devices embodying iron such, for example, as motors, the effect of the ripples is to produce iron losses that lower the efficiency and increase the heating. For such purposes, therefore, it is desirable that the ripples be eliminated, so far as possible. It has been proposed, in the past, to connect a reactance device in series with a vacuum-type converter to perform the double function of assisting in maintaining the converter during the transition of the rectifying arc from one anode to another and also for smoothing out the ripples. By my invention, I substitute for said maintaining reactance, a resonant circuit tuned to the ripple frequency and, therefore, highly responsive to the energy of the ripples, either absorbing said energy in the form of heat or transmitting it to the circuit in a substantially continuous manner, thus rendering the resultant rectified current substantially free from high-frequency variations.

Referring to Fig. 1 for a more detailed understanding of my invention, I show a vapor converter at 9, said converter comprising the usual evacuated container 10 provided with anodes 11—11 and a reconstructing cathode 12. The converter may be started and maintained by any suitable means, such, for example, as a starting and keep-alive anode energized from a direct-current source 14. Energy for conversion in the device 9 is supplied from any suitable source, such, for example, as the secondary winding 15 of a transformer 16 and, after passing through the converter, is supplied to a load 17, thence returning to the mid-point of the winding 15. A resonant circuit 18 is included in the load circuit and comprises an adjustable inductive reactor 19 in parallel with an adjustable capacitative reactor 20.

In the operation of the system of Fig. 1, an impulse is transmitted from each anode 11 during each cycle of the supply and the rectified current, therefore, contains two ripples for each cycle of the supply, as indicated in Fig. 2. The devices 19 and 20 are, therefore, adjusted to be resonant with each other at twice the supply frequency and, by said adjustment, the ripples may be strained out of the rectified current to any desired degree, such action being dependent upon the size of the units 19 and 20.

It is obvious that, if the elements 19 and 20 are in perfect resonance, the tuned circuit 18 can provide no maintaining action for the converter 9 and, if reactive maintenance is desired, it is necessary to adopt an intermediate adjustment in the devices 19 and 20, said adjustment being such that the element 19 preponderates somewhat in value. Said inductive element is thus able to exert a slight maintaining action but the element 20 embodies such capacity that the entire tuned circuit is able to strain out an appreciable portion of the energy of each ripple.

In the system of Fig. 3, a vacuum-type converter 9 is provided with three anodes 21—21 connected respectively to the outer terminals of the star-connected secondary windings 22—22 of a set of three-phase transformers 23—23. The cathode 12 is connected to the neutral point of said star-connected winding through a load 17 and a closed circuit 24 embodying an adjustable inductive reactor 25, and an adjustable capacitative reactor 26.

The operation of the system of Fig. 3 is, in many respects, similar to that of the system of Fig. 1. The polyphase character of the energy supply provides such overlapping of the power arcs within the converter as to reduce the necessity for maintaining reactance, and the circuit 24 may, therefore, be placed in a condition of substantially perfect resonance for three times the frequency of the supply.

While I have shown my invention in a plurality of forms, it is not so limited but is susceptible of various minor changes and modifications within the scope of the appended claims.

I claim as my invention:

1. The combination with a vapor-converter system embodying a maintaining reactance device, of means associated with said device for producing a closed circuit that is resonant to the frequency of the ripples in the rectified current.

2. The combination with a vapor-converter system embodying a maintaining reactance device, of means associated with said device for producing a closed circuit that is resonant to a frequency equal to the supply frequency multiplied by the number of active de-phased power anodes.

3. The combination with a converter system embodying an alternating-current supply circuit, vacuum-type converting apparatus and a load circuit, of a closed circuit connected in series with said load circuit and tuned to be resonant to the frequency of the ripples in the load current.

4. The combination with a converter system embodying an alternating-current supply circuit, vacuum-type converting apparatus and a load circuit, of a closed circuit connected in series with said load circuit and tuned to be resonant to a frequency equal to the frequency of the supply multiplied by the number of de-phased rectifier power arcs in said converting apparatus.

5. The combination with a vapor-converter system embodying a maintaining inductive reactor, of a capacitative reactor in shunt thereto, the relative magnitude of said two reactive members being such that the closed circuit therethrough is rendered substantially resonant to the frequency of the ripples in the rectified current.

6. The combination with a vapor-converter system embodying a maintaining inductive reactor, of a capacitative reactor in shunt thereto, the relative magnitude of said two reactive devices being such that the closed circuit therethrough is rendered substantially resonant to a frequency equal to the supply frequency multiplied by the number of de-phased power arcs.

In testimony whereof, I have hereunto subscribed my name this 25th day of Oct. 1916.

CHARLES LE G. FORTESCUE.